(12) United States Patent
Haijima et al.

(10) Patent No.: US 8,897,623 B2
(45) Date of Patent: Nov. 25, 2014

(54) CONTENT PROCESSING METHOD AND RECORDING APPARATUS

(75) Inventors: Shoichi Haijima, Kawasaki (JP); Yasuhiko Isobe, Kawasaki (JP); Yoji Kimura, Kawasaki (JP); Hiroyuki Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 212 days.

(21) Appl. No.: 13/313,571

(22) Filed: Dec. 7, 2011

(65) Prior Publication Data

US 2012/0076470 A1   Mar. 29, 2012

Related U.S. Application Data

(63) Continuation of application No. PCT/JP2009/003052, filed on Jul. 1, 2009.

(51) Int. Cl.
| | |
|---|---|
| H04N 5/76 | (2006.01) |
| G11B 27/034 | (2006.01) |
| G11B 27/34 | (2006.01) |
| H04N 5/775 | (2006.01) |
| H04N 9/82 | (2006.01) |
| G11B 20/10 | (2006.01) |

(52) U.S. Cl.
CPC .............. *G11B 27/034* (2013.01); *G11B 27/34* (2013.01); *H04N 5/7755* (2013.01); *H04N 9/8205* (2013.01); *H04N 9/8233* (2013.01); *G11B 2020/10537* (2013.01)
USPC ........... 386/295; 386/297; 386/237; 386/238; 386/239

(58) Field of Classification Search
USPC .......................... 386/239, 237, 238, 295, 297
See application file for complete search history.

(56) References Cited

U.S. PATENT DOCUMENTS

| | | | | |
|---|---|---|---|---|
| 5,716,273 A | * | 2/1998 | Yuen | ............................... 463/29 |
| 7,978,720 B2 | * | 7/2011 | Russ et al. | .................... 370/419 |

(Continued)

FOREIGN PATENT DOCUMENTS

| | | |
|---|---|---|
| JP | 2005-333566 | 12/2005 |
| JP | 2006-503496 | 1/2006 |

(Continued)

OTHER PUBLICATIONS

International Preliminary Report on Patentability mailed Feb. 23, 2012 issued in corresponding International Patent Application No. PCT/JP2009/003052.

(Continued)

*Primary Examiner* — Helen Shibru
(74) *Attorney, Agent, or Firm* — Staas & Halsey LLP

(57) ABSTRACT

A content processing method includes receiving content and recording the content in a recording apparatus, recording first information to indicate a first period in which the content is displayed on a display apparatus and a second period in which the content is not displayed on the display apparatus during a period in which the content is recorded, in accordance with the content, and displaying, on the display apparatus, a selection screen which is provided to select any one of the first period and/or the second period as an objective for performing any one of a plurality of processes including a deleting process for deleting a part of the content or a writing process for writing a part of the content on a recording medium with respect to a part of the recorded content, by using the first information.

12 Claims, 19 Drawing Sheets

(56) References Cited

U.S. PATENT DOCUMENTS

| | | | |
|---|---|---|---|
| 8,208,796 B2* | 6/2012 | Prus et al. | 386/291 |
| 2002/0011988 A1* | 1/2002 | Sai et al. | 345/156 |
| 2004/0071439 A1 | 4/2004 | Poslinski et al. | |
| 2004/0091239 A1 | 5/2004 | Poslinski et al. | |
| 2004/0210932 A1* | 10/2004 | Mori et al. | 725/39 |
| 2004/0213546 A1 | 10/2004 | Poslinski et al. | |
| 2005/0111830 A1* | 5/2005 | Kanehira | 386/83 |
| 2006/0039256 A1* | 2/2006 | Nakamura et al. | 369/47.33 |
| 2006/0218585 A1* | 9/2006 | Isobe et al. | 725/39 |
| 2009/0080852 A1* | 3/2009 | Peters | 386/52 |
| 2009/0142036 A1* | 6/2009 | Branam et al. | 386/83 |
| 2009/0150756 A1* | 6/2009 | Mori et al. | 714/807 |
| 2012/0148208 A1* | 6/2012 | Hozumi | 386/201 |

FOREIGN PATENT DOCUMENTS

| | | |
|---|---|---|
| JP | 2006-107609 | 4/2006 |
| JP | 2008-72542 | 3/2008 |
| JP | 2008-154126 | 7/2008 |

OTHER PUBLICATIONS

International Search Report for PCT/JP2009/003052, mailed Aug. 4, 2009.

* cited by examiner

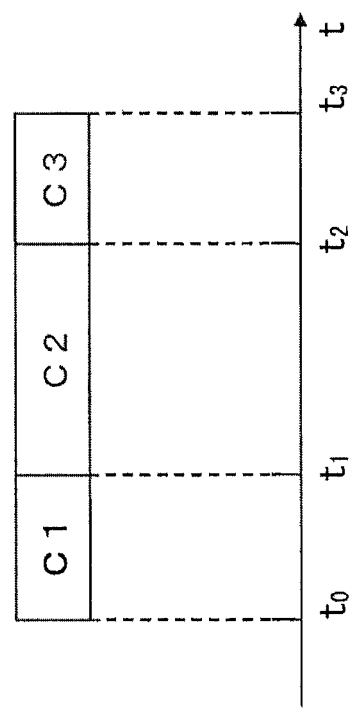

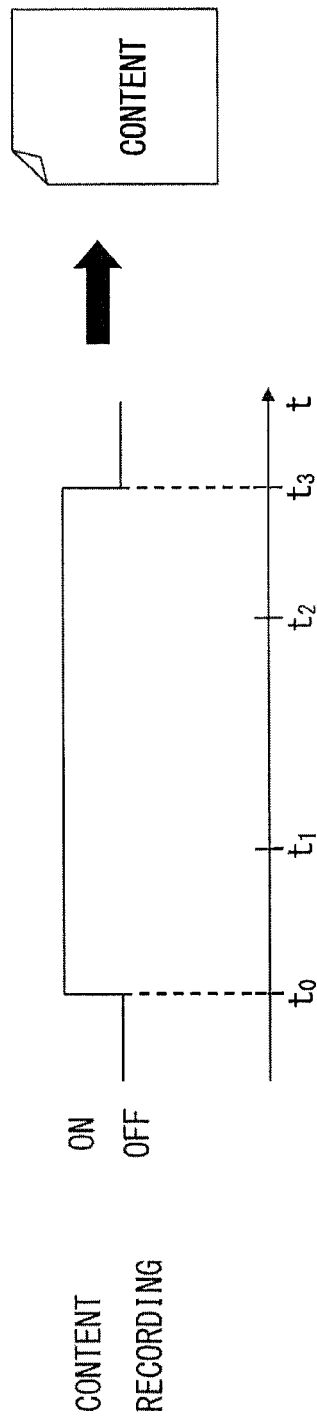

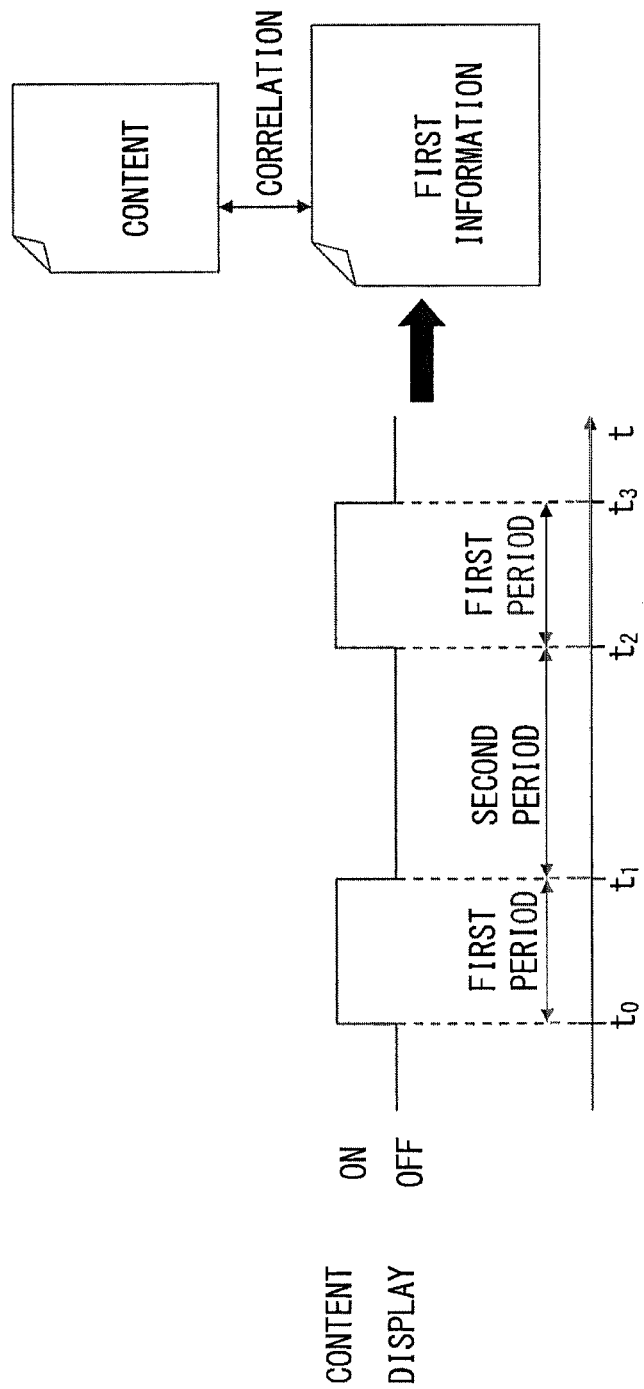

FIG. 2D

| | |
|---|---|
| $t_0 \sim t_1$ | FIRST PERIOD |
| $t_1 \sim t_2$ | SECOND PERIOD |
| $t_2 \sim t_3$ | FIRST PERIOD |

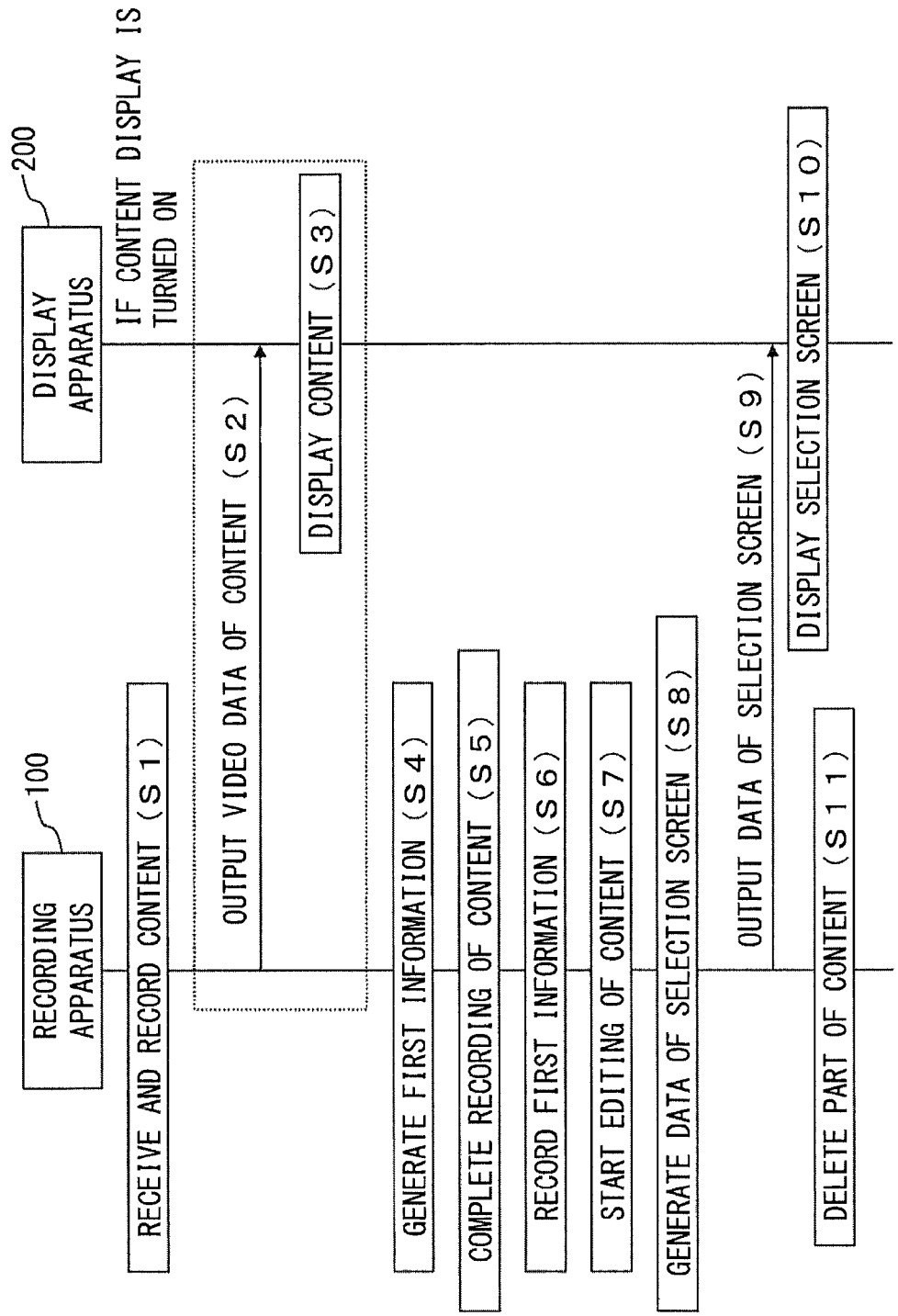

FIG. 4

SELECT PROCESS TO BE PERFORMED FOR CONTENT

| SELECT | PROCESS |
|--------|---------|
| ☑ | DELETING PROCESS FROM RECORDING APPARATUS |
| ☐ | WRITING PROCESS ON RECORDING MEDIUM |

FIG. 5

SELECT PART TO BE DELETED FROM
RECORDING APPARATUS

| SELECT | TIME | STATE |
|--------|------|-------|
| ☑ | $t_0 \sim t_1$ | CONTENT DISPLAY: ON |
| ☐ | $t_1 \sim t_2$ | CONTENT DISPLAY: OFF |
| ☐ | $t_2 \sim t_3$ | CONTENT DISPLAY: ON |

FIG. 7

SELECT PART TO BE DELETED FROM
RECORDING APPARATUS

| SELECT | PART TO BE DELETED |
|--------|--------------------|
| ☐ | ALL |
| ☐ | UNWATCHED PART |
| ☑ | WATCHED PART |

BEFORE
DELETING
PROCESS

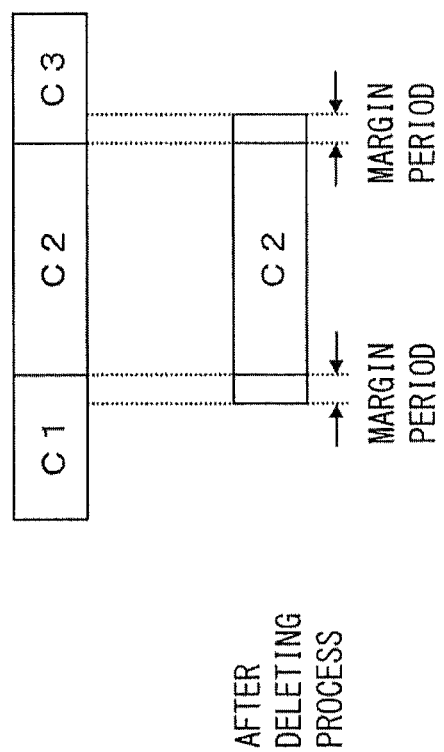

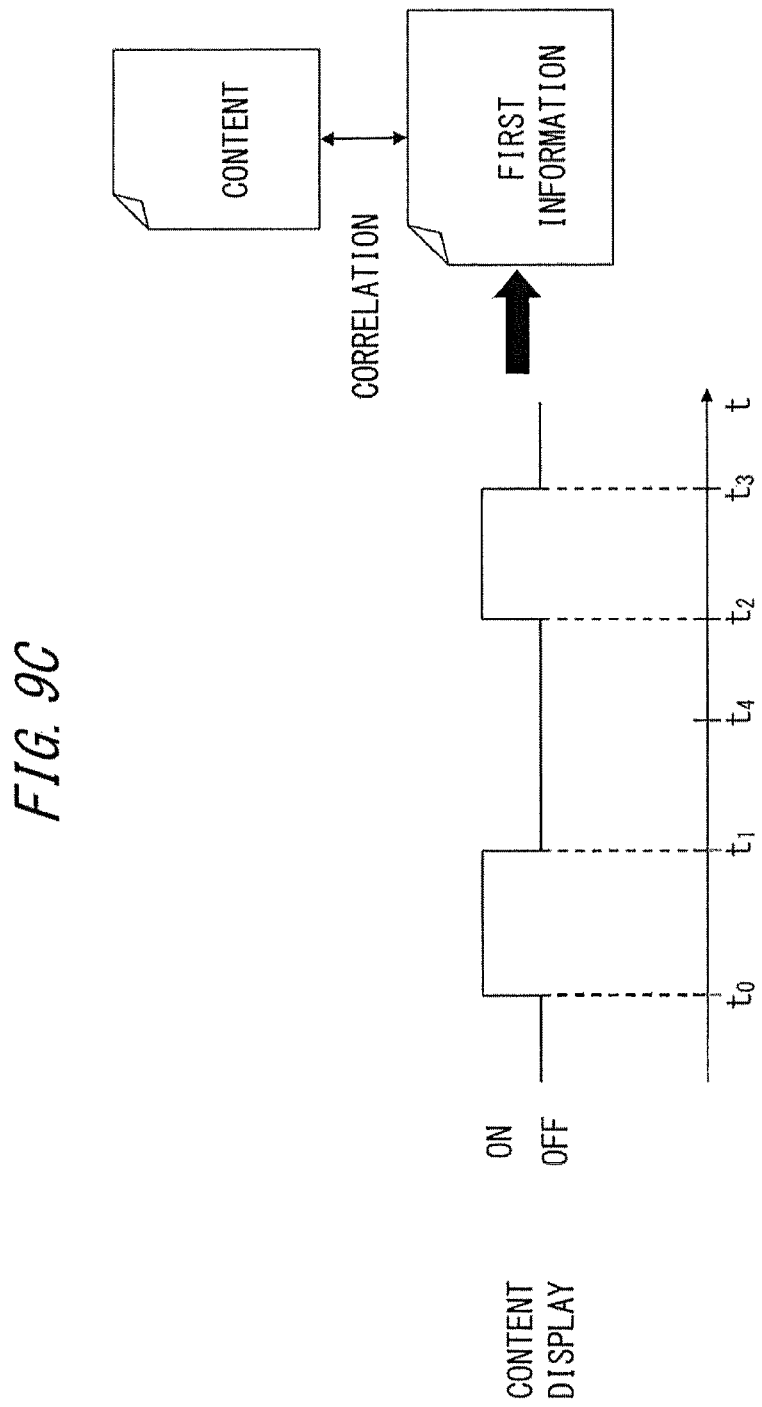

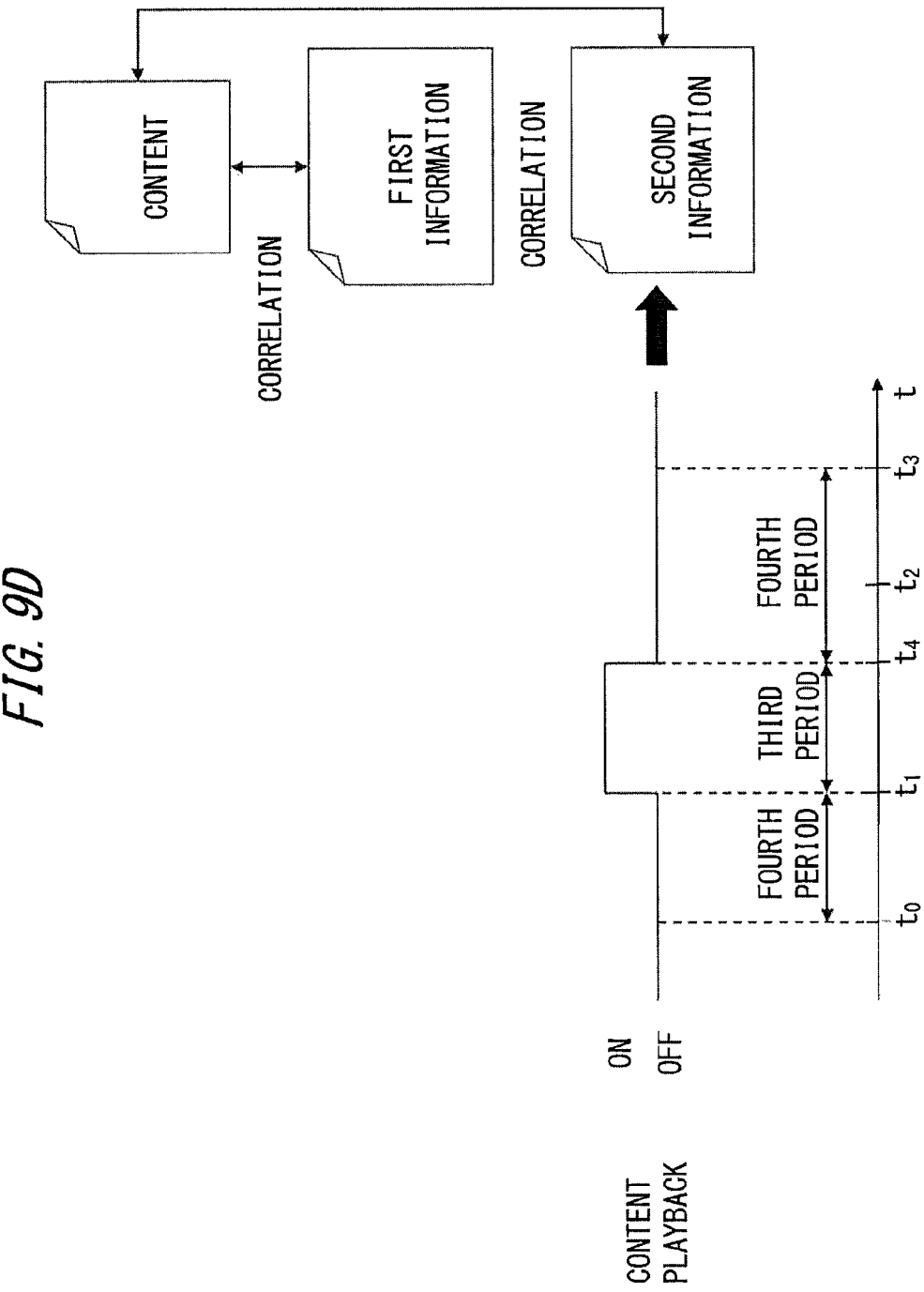

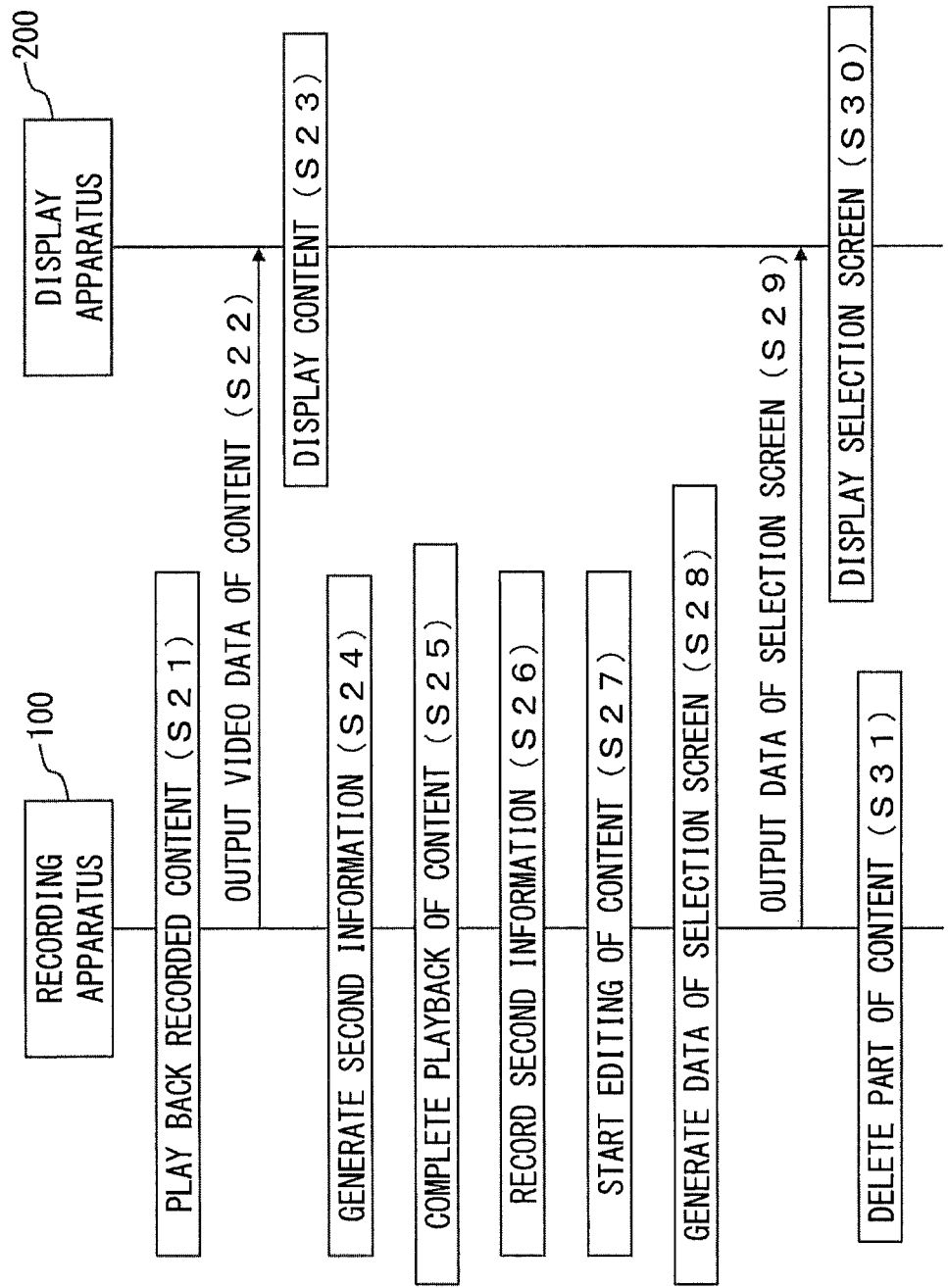

FIG. 11

SELECT PART TO BE DELETED FROM RECORDING APPARATUS

| SELECT | TIME | STATE |
|--------|------|-------|
| ☑ | $t_0 \sim t_1$ | CONTENT DISPLAY: ON |
| ☑ | $t_1 \sim t_4$ | CONTENT PLAYBACK: ON |
| ☐ | $t_4 \sim t_2$ | CONTENT DISPLAY/PLAYBACK: OFF |
| ☐ | $t_2 \sim t_3$ | CONTENT DISPLAY: ON |

CONTENT PROCESSING METHOD AND RECORDING APPARATUS

CROSS-REFERENCE TO RELATED APPLICATIONS

This is a continuation of Application PCT/JP2009/003052, filed on Jul. 1, 2009, now pending, the entire contents of which are incorporated herein by reference.

FIELD

The embodiments discussed herein are related to a technique for processing digital content.

BACKGROUND

A technique is known, wherein it is judged whether or not a user is watching the television broadcasting by using a mobile phone which has the function to receive the digital television broadcasting so that the television broadcasting can be watched later on even if the user unintentionally discontinues the watching during the watching of the television broadcasting.
[Patent Document 1] Japanese Laid-open Patent Publication No. 2008-154126

SUMMARY

According to an aspect of the embodiment, a content processing method includes receiving content and recording the content in a recording apparatus, recording first information to indicate a first period in which the content is displayed on a display apparatus and a second period in which the content is not displayed on the display apparatus during a period in which the content is recorded, in accordance with the content, and displaying, on the display apparatus, a selection screen which is provided to select any one of the first period and/or the second period as an objective for performing any one of a plurality of processes including a deleting process for deleting a part of the content or a writing process for writing a part of the content on a recording medium with respect to a part of the recorded content, by using the first information.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 2A illustrates received content.
FIG. 2B illustrates a period in which the content is recorded.
FIG. 2C illustrates periods in which the content is displayed.
FIG. 2D illustrates exemplary first information.
FIG. 3 illustrates an exemplary processing method for processing content.
FIG. 4 illustrates an exemplary display of a display apparatus when the editing is started.
FIG. 5 illustrates an exemplary selection screen.
FIG. 7 illustrates an exemplary selection screen.
FIG. 8B illustrates the content after the deleting process
FIG. 9C illustrates periods in which the content is displayed.
FIG. 9D illustrates a period in which the recorded content is played back or reproduced.
FIG. 10 illustrates an exemplary editing method for editing content.
FIG. 11 illustrates an exemplary selection screen.

DESCRIPTION OF EMBODIMENTS

When a recording apparatus such as an HDD (Hard Disk Drive) recorder or the like records the content, the recording apparatus may not record any content having an amount of data exceeding a recordable capacity. Therefore, a user is forced to appropriately perform, for example, such a process that any unnecessary content, which is included in the content recorded in the recording apparatus, is deleted, or any necessary content is written on a recording medium such as DVD (Digital Versatile Disk) or the like. The operation, in which the user deletes the content from the recording apparatus in content unit or the user writes the content on the recording medium in content unit, can be performed relatively easily.

However, for example, when the user watches a part of the content during the period in which the recording apparatus receives the content and the recording apparatus records the content, the user sometimes performs such a deleting process later on that only the part of the content already watched by the user is deleted, in order to decrease the data amount in the recording apparatus. In another situation, when the user watches only a part of the content intended to be watched by the user during the period in which the recording apparatus records the content, the user sometimes performs such a writing process later on that the part of the content already watched by the user is written on the recording medium.

As described above, when the user performs the editing operation in relation to the objective of a part of the content having been recorded in the recording apparatus, the user himself/herself has been hitherto forced to specify the part of the content which has been already watched or the part of the content which has not been watched, while performing the fast-forward or the rewind with respect to the content. Therefore, the conventional editing operation for editing the content requires time and labor.

An explanation will be made below on the basis of embodiments about examples of the content processing method and the recording apparatus. In the following explanation about the respective embodiments, the term "time" is used to specify the relative position on the time axis of the video data in the content in which the time and the video data are correlated with each other.

[First Embodiment]

In this embodiment, an explanation will be made about an exemplary content processing method in which a recording apparatus receives the digital broadcasting, the content is recorded, and the recorded content is edited.

Figure 1:
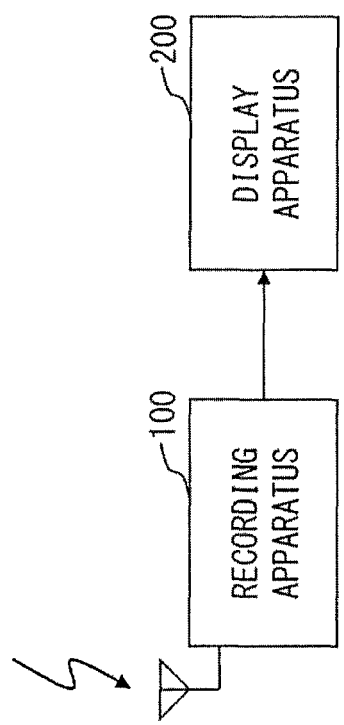
FIG. 1 illustrates an exemplary schematic arrangement of a system for processing content.

At first, an explanation will be made about an exemplary schematic arrangement of a system for processing the content with reference to FIG. 1. As illustrated in FIG. 1, the system includes a recording apparatus 100 and a display apparatus 200.

The recording apparatus 100 is provided with an antenna, and the recording apparatus 100 receives and records the contents of the digital broadcasting. The recording apparatus 100 is exemplified, for example, by an HDD recorder, a DVD recorder, a Blu-ray Disk recorder, a digital television apparatus provided with the recording function, and a personal computer provided with a digital tuner. Further, the recording apparatus 100 is connectable to the display apparatus 200 and outputs the video data of the content received by the recording apparatus 100 and/or the content recorded in the recording apparatus 100 to the display apparatus 200, and thus the content can be displayed on the display apparatus 200.

The display apparatus 200 displays the content by using the video data of the content outputted from the recording apparatus 100. The display apparatus 200 displays the content, and thus a user can watch the content. Any arbitrary display system, which includes, for example, the liquid crystal display and the plasma display, can be applied to the display apparatus 200, provided that the content can be displayed by using the data of the content outputted from the recording apparatus 100.

An explanation will now be made with reference to FIG. 2 about the data recorded by the recording apparatus 100 when the user watches a part of the content by means of the display apparatus 200 during the period in which the recording apparatus 100 records the received content. The horizontal axis in FIG. 2 is the axis to show the time in the content. FIG. 2A illustrates the received content. As illustrated in FIG. 2A, respective parts of the content, which are divided as the period in which the content is displayed on the display apparatus 200 and the period in which the content is not displayed on the display apparatus 200, are referred to as C1, C2, C3 . . . in a chronological order in the period in which the content is recorded in the recording apparatus 100. In the following description, the period, in which the content is displayed on the display apparatus 200 in the period in which the content is recorded in the recording apparatus 100, is referred to as "first period", and the period, in which the content is not displayed on the display apparatus 200, is referred to as "second period".

FIG. 2B illustrates the period in which the recording apparatus 100 performs the recording while receiving the content. An example illustrated in FIG. 2B shows that the recording apparatus 100 performs the recording while receiving the content in Period $t_0$-$t_3$ in which the content recording is turned ON. FIG. 2C illustrates the period in which the display apparatus 200 displays the same content as the content recorded by the recording apparatus 100 during the period in which the recording apparatus 100 records the content. An example illustrated in FIG. 2C shows that the display apparatus 200 displays the same content as the content recorded by the recording apparatus 100 in Period $t_0$-$t_1$ and Period $t_2$-$t_3$ in which the content display is turned ON. Further, FIG. 2C illustrates that the display apparatus 200 does not display the same content as the content recorded by the recording apparatus 100 in Period $t_1$-$t_2$ in which the content display is turned OFF. Therefore, in the example illustrated in FIG. 2C, there are two first periods of Period $t_0$-$t_1$ and Period $t_2$-$t_3$ and one second period of Period $t_1$-$t_2$. It is herein assumed that $t_0 < t_1 < t_2 < t_3$ holds.

It is noted that whether or not the user watches the same content as the content recorded by the recording apparatus 100 is judged depending on whether or not the display apparatus 200 displays the concerning content.

The recording apparatus 100 generates the information (hereinafter referred to as "first information") which indicates the period (first period) in which the content is displayed on the display apparatus 200 and the period (second period) in which the content is not displayed on the display apparatus 200 during the period in which the content is recorded in the recording apparatus 100. FIG. 2D illustrates an example of the first information generated by the recording apparatus 100. In an example illustrated in FIG. 2D, the first information includes such information that Period $t_0$-$t_1$ and Period $t_2$-$t_3$ are the first periods respectively, and Period $t_1$-$t_2$ is the second period. The recording apparatus 100 acquires, from the display apparatus 200, for example, the signal (hereinafter referred to as "first signal") to indicate whether or not the power source of the display apparatus 200 is turned ON, and thus the recording apparatus 100 can generate the first information. The generated first information is recorded in the recording apparatus 100 while allowing the first information to correlate with the content.

Next, an explanation will be made with reference to FIG. 3 about an example of the content processing method correlated with FIG. 2. FIG. 3 illustrates a flow in which the user edits the content after the display apparatus 200 displays a part of the content during the period in which the recording apparatus 100 receives and records the content.

At first, the recording apparatus 100 receives the content, and the recording apparatus 100 records the content (Step S1). In this embodiment, as explained with reference to FIG. 2B, the recording apparatus 100 receives and records the content in Period $t_0$-$t_3$.

If the power source of the display apparatus 200 is turned ON, the recording apparatus 100 outputs the video data of the content to the display apparatus 200 (Step S2). Further, the display apparatus 200 acquires the video data of the content from the recording apparatus 100, and the display apparatus 200 displays the content (Step S3). If the power source of the display apparatus 200 is not turned ON, the processes of Steps S2, S3 are not performed. In this embodiment, as explained with reference to FIG. 2C, the power source of the display apparatus 200 is turned on in Period $t_0$-$t_1$ and Period $t_2$-$t_3$, wherein the display apparatus 200 displays the same content as the content recorded by the recording apparatus 100. Further, the power source of the display apparatus 200 is not turned on in Period $t_1$-$t_2$, wherein the display apparatus 200 does not display the same content as the content recorded by the recording apparatus 100.

Further, the recording apparatus 100 generates the information (first information) to indicate the first period in which the display apparatus 200 displays the content and the second period in which the display apparatus 200 does not display the content, during the period in which the content is recorded (Step S4). Usually, Steps S1 to S4 are performed substantially simultaneously at the same time. In this embodiment, the recording apparatus 100 generates the first information explained with reference to FIG. 2D.

At the time $t_3$, the recording apparatus 100 completes the recording of the content (Step S5). The recording apparatus 100 records the generated first information while allowing the first information to correlate with the content (Step S6).

After that, the recording apparatus 100 starts up an application program in order to start the editing of the content recorded in the recording apparatus 100 in accordance with the instruction input brought about by the user (Step S7). When the application program is started up, the recording apparatus 100 firstly allows the display apparatus 200 to display a screen on which the user selects the process to be performed for the content. FIG. 4 illustrates an example of the screen on which the user selects the process to be performed for the content, the screen being displayed by the display apparatus 200. The user can select, for example, any one of a plurality of processes including, for example, the deleting process for deleting the content from the recording apparatus 100 and the writing process for writing the content on a recording medium such as DVD or the like. An example illustrated in FIG. 4 is illustrative of a case in which the user selects the deleting process for deleting the content from the recording apparatus 100.

Subsequently, the recording apparatus 100 generates the data of the screen for allowing the user to select whether or not the respective parts C1 to C3 of the content explained with reference to FIG. 2A are deleted from the recording apparatus 100 by using the first information in accordance with the application program (Step S8). The screen, which is provided to select any one of the first period and/or the second period as the objective or target to perform any one of a plurality of processes including the deleting process for deleting a part of the content or the writing process for writing a part of the content on the recording medium with respect to the part of the recorded content, is hereinafter referred to as "selection screen". The recording apparatus 100 outputs the data of the selection screen to the display apparatus 200 (Step S9).

The display apparatus 200 acquires the data of the selection screen from the recording apparatus 100, and the display apparatus 200 displays the selection screen (Step S10). An explanation will now be made with reference to FIG. 5 about the selection screen displayed by the display apparatus 200. FIG. 5 illustrates an example of the selection screen displayed by the display apparatus 200. In the example illustrated in FIG. 5, when a part of the content is deleted from the recording apparatus 100, the user selects the part or portion to be deleted. In this embodiment, the recording apparatus 100 records the first information while allowing the first information to be in correlation with the content. Therefore, the user can select whether or not the part is to be deleted from the recording apparatus 100 in relation to each of the parts or portions of Period $t_0$-$t_1$, Period $t_1$-$t_2$, Period $t_2$-$t_3$ of the content.

The recording apparatus 100 performs the deleting process for deleting the part of the content selected by the user (Step S11). For example, if the user selects only Period $t_0$-$t_1$ as the first period as in the example illustrated in FIG. 5, then the recording apparatus 100 deletes only the part of Period $t_0$-$t_1$ of the content, and the recording apparatus 100 allows the part of Period $t_1$-$t_3$ to remain in the recording apparatus 100. On the other hand, if the user selects Period $t_0$-$t_1$ as the first period and Period $t_1$-$t_2$ as the second period, then the recording apparatus 100 deletes only the part of Period $t_0$-$t_2$ of the content, and the recording apparatus 100 allows the part of Period $t_2$-$t_3$ to remain in the recording apparatus 100.

As explained above, in the content processing method of this embodiment, the recording apparatus 100 records the first information while allowing the first information to be in correlation with the content. Therefore, according to the content processing method of this embodiment, the recording apparatus 100 can specify or identify the part which is included in the content and which has been already watched by the user.

The recording apparatus 100 allows the display apparatus 200 to display the selection screen by using the first information. Therefore, it is unnecessary for the user himself/herself to specify or identify the part which is included in the content and which has been already watched by the user.

Therefore, according to the content processing method of this embodiment, it is possible to reduce the load exerted on the user in the editing operation for editing the content.

This embodiment is illustrative of the exemplary case in which the display apparatus 200 displays the content by using the video data of the content outputted from the recording apparatus 100. However, it is also allowable that the display apparatus 200 is provided with a receiving unit for receiving the content of the digital broadcasting, distinctly from the receiving unit provided for the recording apparatus 100. In this case, even when the power source of the display apparatus 200 is turned ON, if the channel, for which the recording apparatus 100 performs the recording, is different from the channel for which the display apparatus 200 performs the display, then the display apparatus 200 does not display the same content as the content recorded by the recording apparatus 100.

In view of the above, the recording apparatus 100 acquires, for example, the signal (hereinafter referred to as "second signal") to indicate the broadcasting program (program) of the content displayed by the display apparatus 200, in addition to the first signal. Thus, it is possible to judge whether or not the concerning content is displayed, and it is possible to generate the first information.

[Second Embodiment]

In this embodiment, an explanation will be made about an example of the specified arrangement of the recording apparatus 100 in order to realize the content processing method explained in the first embodiment.

[Schematic Arrangement of Recording Apparatus]

Figure 6:
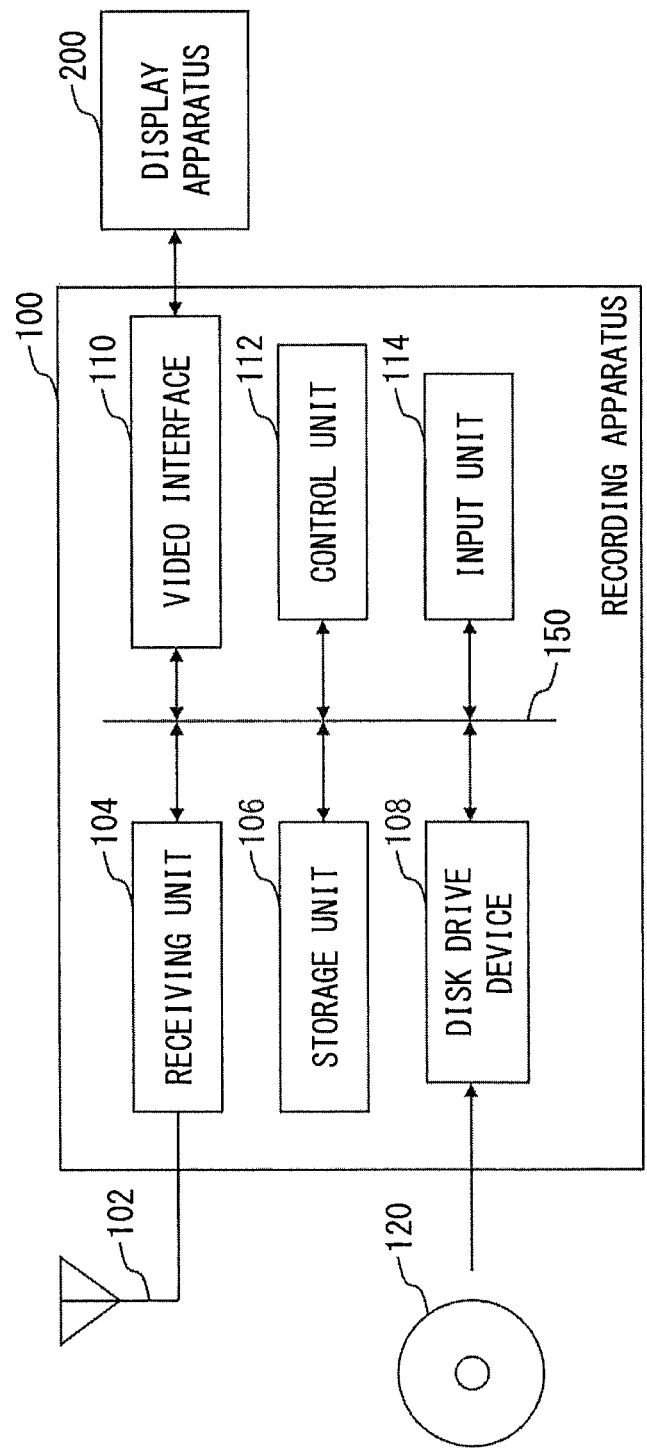
FIG. 6 illustrates an exemplary arrangement of a recording apparatus for processing content.

At first, an explanation will be made with reference to FIG. 6 about the arrangement of the recording apparatus 100 for processing the content. As illustrated in FIG. 6, the recording apparatus 100 includes an antenna 102, a receiving unit 104, a storage unit 106, a disk drive device 108, a video interface 110, a control unit 112, and an input unit 114. These components are connected via a bus 150. Further, the recording apparatus 100 is connectable to the display apparatus 200.

The receiving unit 104 is connected to the antenna 102. The receiving unit 104 performs, for example, the tuning or selection of the digital broadcasting, the receiving, the frequency conversion, the amplification, and the demodulation, and the receiving unit 104 receives the content. The receiving unit 104 includes, for example, a digital tuner.

The storage unit 106 records the content received by the receiving unit 104. The storage unit 106 includes a nonvolatile memory such as an HDD, a flash memory or the like. The storage unit 106 can record the first information while allowing the first information to be in correlation with the content to be recorded.

The disk drive device 108 records the content received by the receiving unit 104 on a recording medium 120. Further, the disk drive device 108 writes all or a part of the content recorded in the storage unit 106 on the recording medium 120. The disk drive device 108 is, for example, a peripheral device such as a DVD drive device, a Blu-ray drive device or the like. For example, DVD or BD (Blu-ray Disc) can be used as the recording medium 120. The disk drive device 108 can record the first information while allowing the first information to be in correlation with the content.

The user can select whether the content, which is received by the receiving unit 104, is stored in the storage unit 106 or the content is written into the recording medium 120 by using the disk drive device 108. Therefore, the storage unit 106 and the disk drive device 108 are inclusively referred to as "recording unit". This embodiment is illustrative of an exemplary case in which the content received by the receiving unit 104 is recorded in the storage unit 106.

The video interface 110 is an interface which is provided to transmit the video data between the recording apparatus 100 and the display apparatus 200. The video interface 110 is, for example, HDMI (High-Definition Multimedia Interface), DVI (Digital Visual Interface), or LVDS (Low voltage differential signaling).

The control unit 112 includes CPU (computer) as a main component. The control unit 112 acquires the first signal by the aid of the video interface 110 during the period in which the storage unit 106 records the content, and thus the control unit 112 generates the first information. Further, the control unit 112 operates an application program to perform the editing operation for the content, and the screen, on which the user selects the process to be performed for the content, is displayed on the display apparatus 200 by the aid of the video interface 110. Further, the data of the selection screen is generated in order to select any one of the first period and/or the second period as the objective to perform the process which is, for example, the deleting process for deleting a part of the content or the writing process for writing a part of the content on the recording medium 120 with respect to the part of the content recorded in the storage unit 106. The control unit 112 allows the display apparatus 200 to display the selection screen by the aid of the video interface 110. Further, the control unit 112 performs the process which is, for example, the deleting process for deleting a part of the content or the writing process for writing a part of the content on the recording medium 120, in response to the selection performed by the user on the selection screen.

The input unit 114 receives the input of the instruction from the user. For example, the input unit 114 receives the input to instruct the start of the editing of the content recorded in the storage unit 106 and/or the input to select a part of the content as the objective to perform the editing on the selection screen.

The schematic arrangement of the recording apparatus 100 according to this embodiment has been described above.

The display apparatus 200 can display the content. When the display apparatus 200 is not provided with any digital tuner, it is possible to use, for example, DVI as the video interface 110. Accordingly, the control unit 112 can acquire the first signal by the aid of the video interface 110 during the period in which the storage unit 106 records the content, and it is possible to generate the first information by using the first signal. When the display apparatus 200 is provided with any digital tuner, then it is possible to use, for example, HDMI as the video interface 110, and it is possible to use the CEC (Consumer Electronics Control) function of HDMI. Accordingly, the control unit 112 can acquire the first signal and the second signal by the aid of the video interface 110 during the period in which the storage unit 106 records the content, and it is possible to generate the first information by using the first signal and the second signal.

This embodiment is illustrative of an exemplary case in which the display apparatus 200 is not provided with any digital tuner and the content outputted from the recording apparatus 100 is displayed thereon.

[Content Processing Method]

Next, an explanation will be made about a content processing method based on the use of the recording apparatus 100 described above. The outline of the content processing method is the same as or equivalent to that of the method explained with reference to FIG. 3. Accordingly, in the following description, the respective steps explained with reference to FIG. 3 will be explained in detail.

At first, Step S1 is explained. In Step S1, the antenna 102 receives the radio wave of the digital broadcasting, and the receiving unit 104 extracts, from the received radio wave, the signal of the broadcasting program (program) selected depending on the selection instruction brought about by the user. The storage unit 106 records the signal of the broadcasting program extracted by the receiving unit 104.

In the next place, Step S2 and Step S3 are explained. When the user watches the content during the period in which the recording apparatus 100 records the content, the process of Step S2 is firstly performed. In Step S2, for example, the video interface 110, which is constructed by DVI, outputs, to the display apparatus 200, the video data of the content received by the receiving unit 104. In Step S3, the display apparatus 200 acquires the video data of the content outputted from the video interface 110, and the display apparatus 200 displays the same content as the content received by the receiving unit 104 in Step S1.

In the next place, Step S4 is explained. In Step S4, the control unit 112 acquires the first signal from the video interface 110. In this embodiment, for example, the first signal, which indicates whether or not the power source of the display apparatus 200 is turned ON, is successively acquired by the control unit 112 from the video interface 110 constructed by DVI until the recording of the content is completed. The control unit 112 generates the first information by using the acquired first signal.

In the next place, Step S5 and Step S6 are explained. When the time comes to finish the content, the storage unit 106 completes the recording of the content in Step S5. The first information, which is generated in Step S4, is recorded by the control unit 112 in the storage unit 106 while allowing the first information to be in correlation with the content.

In the next place, Step S7 is explained. When the user edits the content recorded in the storage unit 106, for example, the operation input is performed in order to instruct the start of the editing operation. In Step S7, the control unit 112 firstly executes the program (application program) in order to edit the content in accordance with the instruction input by the user. The program is previously recorded, for example, in the storage unit 106. The control unit 112 controls the video interface 110 so that the display apparatus 200 is allowed to display the screen on which the user selects the editing process to be performed for the content as illustrated in FIG. 4.

In the next place, Step S8 to Step S10 are explained. In Step S8, the control unit 112 firstly reads, from the storage unit 106, the first information correlated with the content to be edited. The control unit 112 generates the data of the selection screen as illustrated in FIG. 5 by using the first information. In Step S9, the video interface 110 outputs, to the display apparatus 200, the data of the selection screen generated by the control unit 112. In Step S10, the display apparatus 200 acquires the data of the selection screen outputted from the video interface 110, and the display apparatus 200 displays the selection screen.

The processes from Step S8 to Step S10 are performed by executing the program previously stored, for example, in the storage unit 106 by the control unit 112.

In the next place, Step S11 is explained. When the user selects the part to be deleted from the content on the selection screen as illustrated in FIG. 5, the control unit 112 performs the deleting process for deleting the part selected by the user, the part being included in the content recorded in the storage unit 106.

The content processing method is carried out as explained above.

As explained above, the recording apparatus 100 of this embodiment is operated such that the control unit 112 acquires the first information by the aid of the video interface 110, and the storage unit 106 records the first information while allowing the first information to correlate with the content. Therefore, the recording apparatus 100 of this embodiment can specify the part or portion of the content having been already watched by the user.

The control unit 112 allows the display apparatus 200 to display the selection screen by using the first information. Therefore, it is unnecessary to specify the part or portion of the content having been already watched by the user himself/herself.

Therefore, according to the recording apparatus 100 of this embodiment, it is possible to reduce the load exerted on the user in the editing operation for editing the content.

This embodiment is illustrative of an exemplary case in which a part of the content recorded in the storage unit 106 is deleted from the storage unit 106, as one of the plurality of processes which can be selected by the user. However, there is no limitation thereto. In another example, as explained with reference to FIG. 4, for example, it is also possible to perform such a process that a part of the content recorded in the storage unit 106 is written into the recording medium 120. In this case, it is possible to select a part of the content recorded in the storage unit 106 to be written into the recording medium 120, on the selection screen as explained with reference to FIG. 5.

[First Modified Embodiment]

In the content processing method according to the embodiments, as illustrated in FIG. 5, the method has been explained, in which it is possible to individually select whether or not the content is deleted from the storage unit 106 by the user in relation to all of the first period or periods and all of the second period or periods respectively. However, if the user frequently switches ON and OFF of the power source of the display apparatus 200 during the period in which the content is recorded, the selection screen becomes complicated. Further, when the display apparatus 200 is provided with a receiving unit for receiving the content of the digital broadcasting distinctly from the receiving unit provided for the recording apparatus 100, if the user frequently changes the broadcasting program (program) displayed by the display apparatus 200, then the selection screen becomes complicated.

In such situations, it is also allowable that the process can be collectively selected for all of the first period or periods or all of the second period or periods.

An explanation will now be made with reference to FIG. 7 about another example of the selection screen displayed on the display apparatus 200 in Step S10. The control unit 112 allows the display apparatus 200 to display the selection screen as illustrated in FIG. 7 by the aid of the video interface 110. In the example illustrated in FIG. 7, it is possible to select the part to be deleted by the user from the part (watched part) displayed by the display apparatus 200 during the period in which the content is recorded, the part (unwatched part) not displayed by the display apparatus 200 during the period in which the content is recorded, or the entire content. In this procedure, if the user selects the watched part as in the example illustrated in FIG. 7, the control unit 112 collectively deletes C1 and C3 as the parts in the first periods of the respective parts C1, C2, C3 of the content as explained with reference to FIG. 2A by using the first information.

As explained above, the user can collectively select all of the first period or periods (watched part or parts) or all of the second period or periods (unwatched part or parts) included in the content to be edited, by using the selection screen explained with reference to FIG. 7. Therefore, even when the user frequently switches ON and OFF of the power source of the display apparatus 200 during the period in which the content is recorded and/or even when the user changes the broadcasting program (program) displayed by the display apparatus 200, then it is possible to edit the content by means of the simple and convenient operation.

[Second Modified Embodiment]

Figure 8A:
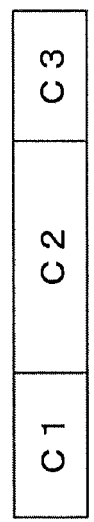
FIG. 8A illustrates content before a deleting process.

In this modified embodiment, an explanation will be made with reference to FIG. 8 about another exemplary case in which a part of the recorded content is deleted. FIG. 8A illustrates an example of the content before performing the deleting process. In the content processing method of the embodiment described above, for example, if the parts C1 and C3, which are included in the respective parts C1, C2, C3 of the content illustrated in FIG. 8A, are deleted, all of the parts C1 and C3 are deleted. However, when the user watches the part C2 of the content, as illustrated in FIG. 8B, the contents or details of the content of the part C2 can be easily grasped in some cases by watching parts of certain periods (hereinafter referred to as "margin periods") existing before and after the part C2 of the content.

Figure 8C:
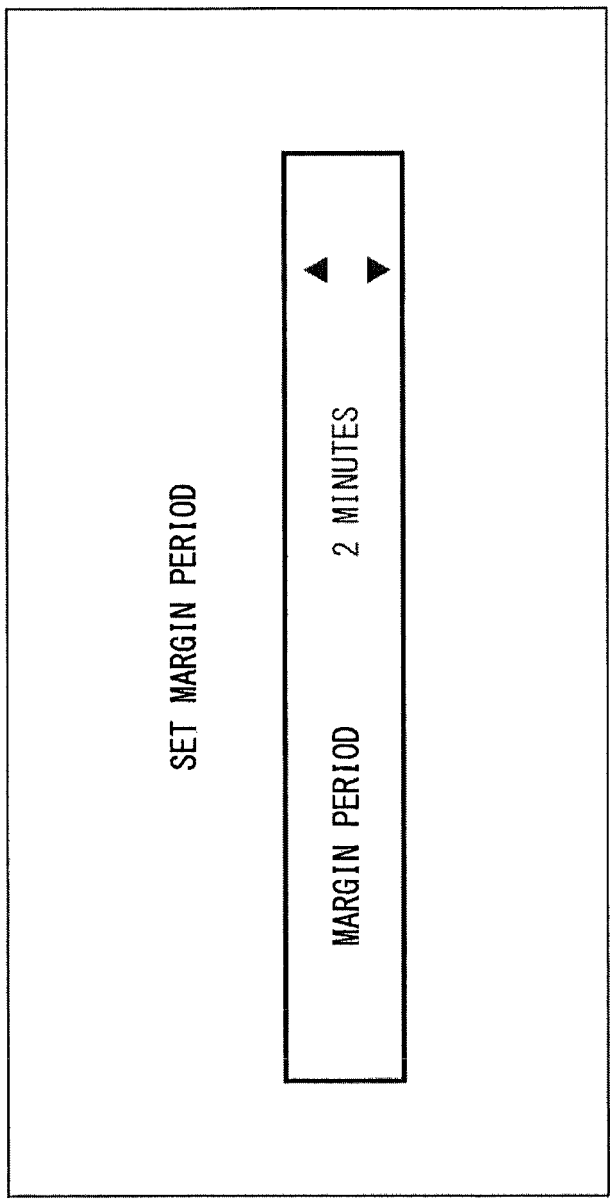
FIG. 8C illustrates an exemplary screen for setting a margin period.

In view of the above, when the recording apparatus 100 performs the deleting process for deleting a part of the content, it is preferable that the margin periods are set before and after the part of the content which is not deleted, and the deleting process is not performed for the content included in the margin periods. FIG. 8C illustrates an example of the screen displayed by the display apparatus 200 when the user sets the margin period. For example, the recording apparatus 100 allows the display apparatus 200 to display the screen illustrated in FIG. 8C after the user selects the part to be deleted on the selection screen displayed by the display apparatus 200 in Step S8. The input unit 114 receives the input of the margin periods from the user, and the margin periods are set. As illustrated in FIG. 8B, when the deleting process is performed for the part of the content, the recording apparatus 100 does not delete the content included in the parts of the margin periods having been set.

As explained above with reference to FIG. 8, in the recording apparatus 100 of this modified embodiment, the margin periods are set before and after the part of the content not to be deleted, and the deleting process is not performed for the content included in the margin periods. Therefore, the user can easily grasp the details of the part of the content not to be deleted in correlation with the details existing before and after the concerning part, by means of the simple and convenient operation.

[Third Embodiment]

In the embodiment described above, the explanation has been made about the method in which the recording apparatus 100 receives the digital broadcasting to record the content and the recorded content is edited. By the way, the user sometimes edits the content after a part of the content recorded in the recording apparatus 100 is played back and watched.

It is also preferable to reduce the load exerted on the user when the editing operation is performed for the content after a part of the recorded content is played back and watched by the user.

In this embodiment, an explanation will be made about a method in which the user edits the content when a part of the recorded content is played back after the recording apparatus 100 receives the digital broadcasting to record the content.

Figure 9A:
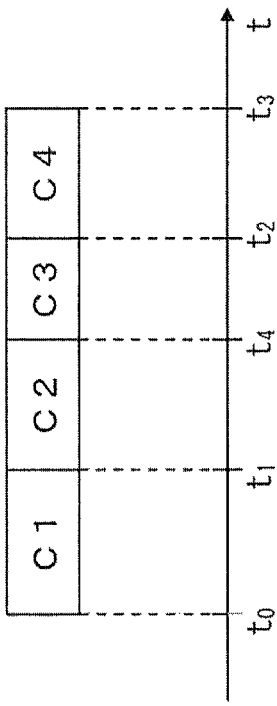
FIG. 9A illustrates recorded content.

At first, an explanation will be made with reference to FIG. 9 about the data recorded by the recording apparatus 100 when a part of the content, which is recorded in the recording apparatus 100, is played back by the recording apparatus 100. The horizontal axis in FIG. 9 is the axis to represent the time in the content. FIG. 9A illustrates the content recorded in the recording apparatus 100. As illustrated in FIG. 9A, respective parts of the content, which are divided as the period in which the content recorded in the recording apparatus 100 is played back and the period in which the content recorded in the recording apparatus 100 is not played back in addition to the first period and the second period described above, are referred to as C1, C2, C3, C4 . . . in a chronological order. In the following description, the period, in which the content recorded in the recording apparatus 100 is played back, is referred to as "third period", and the period, in which the content recorded in the recording apparatus 100 is not played back, is referred to as "fourth period".

Figure 9B:
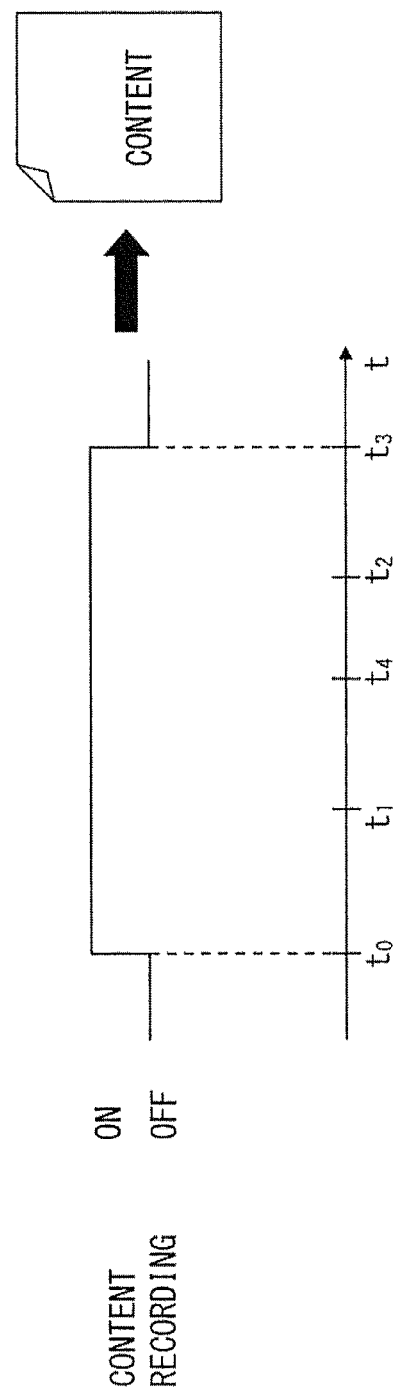
FIG. 9B illustrates a period in which the content is recorded

FIG. 9B and FIG. 9C are the same as or equivalent to those of the example explained with reference to FIG. 2B and FIG. 2C respectively. That is, FIG. 9B illustrates the period in which the recording apparatus 100 performs the recording while receiving the content. FIG. 9C illustrates the period in which the display apparatus 200 displays the same content as the content recorded by the recording apparatus 100 during the period in which the recording apparatus 100 records the content.

FIG. 9D illustrates the period in which the content recorded in the recording apparatus 100 is played back by the recording apparatus 100. An example illustrated in FIG. 9D illustrates that the part of Period $t_1$-$t_4$, in which the content playback is turned ON and which is included in the recorded content, is played back by the recording apparatus 100. The example illustrated in FIG. 9D illustrates that the parts of Period $t_0$-$t_1$ and Period $t_4$-$t_3$, in which the content playback is turned OFF and which are included in the recorded content, are not played back by the recording apparatus 100. Therefore, in the example illustrated in FIG. 9D, there are one third period of Period $t_1$-$t_4$ and two fourth periods of Period $t_0$-$t_1$ and Period $t_4$-$t_3$. It is herein assumed that $t_0 < t_1 < t_4 < t_2 < t_3$ holds.

The recording apparatus 100 generates the information (hereinafter referred to as "second information") which indicates the period (third period) in which the recorded content is played back and the period (fourth period) in which the recorded content is not played back. In the example illustrated in FIG. 9D, the second information includes the information which indicates that Period $t_1$-$t_4$ is the third period and Period $t_0$-$t_1$ and Period $t_4$-$t_3$ are the fourth periods respectively. The recording apparatus 100, for example, sets Period $t_0$-$t_3$ as the fourth period until the recorded content is played back. If the part of the recorded content is played back, then the playback period is reset to the third period and the other period is reset to the fourth period. Accordingly, it is possible to generate the second information. The generated second information is recorded in the recording apparatus 100 while allowing the second information to correlate with the content.

Next, an explanation will be made with reference to FIG. 10 about an example of the content processing method correlated with FIG. 9. FIG. 10 illustrates a flow in which the user edits the content after the recording apparatus 100 plays back a part of the content recorded in the recording apparatus 100. As illustrated in FIG. 9B, as for the recorded content, the content is recorded in the recording apparatus 100 in Period $t_0$-$t_3$ in the same manner as in the embodiment described above. As illustrated in FIG. 9C, the same content as the recorded content is displayed by the display apparatus 200 in Period $t_0$-$t_1$ and Period $t_2$-$t_3$. An explanation will be made below about a method in which the recording apparatus 100 processes the content after the content is recorded by the recording apparatus 100.

At first, the recording apparatus 100 plays back the recorded content (Step S21). In this embodiment, the part of Period $t_1$-$t_4$, which is included in the recorded content, is played back as explained with reference to FIG. 9D. The recording apparatus 100 outputs, to the display apparatus 200, the video data of the content of the part to be played back (Step S22). The display apparatus 200 acquires the video data of the content from the recording apparatus 100 to display the content (Step S23).

The recording apparatus 100 generates the information (second information) which indicates the third period in which the recorded content is played back and the fourth period in which the recorded content is not played back (Step S24). Usually, Steps S21 to S24 are performed substantially simultaneously at the same time.

The recording apparatus 100 plays back the content from the part of the time $t_1$ of the recorded content. If the playback is performed until arrival at the part of the time $t_4$, the playback of the content is completed (Step S25). The recording apparatus 100 records the generated second information while allowing the second information to correlate with the content (Step S26).

After that, the recording apparatus 100 starts the editing of the content which is recorded in the recording apparatus 100 and which has the part subjected to the playback, in accordance with the instruction input performed by the user (Step S27). When the editing operation for editing the content is started, the recording apparatus 100 firstly allows the display apparatus 200 to display a screen on which the user selects the process to be performed for the content. In this procedure, the process, which is the same as or equivalent to the process explained with reference to FIG. 4, is performed.

In the next place, the recording apparatus 100 generates the data of the screen (selection screen) for allowing the user to select whether or not the respective parts C1 to C4 of the content explained with reference to FIG. 9A are deleted from the recording apparatus 100 by using the first information and the second information (Step S28). The recording apparatus 100 outputs the data of the selection screen to the display apparatus 200 (Step S29).

The display apparatus 200 acquires the data of the selection screen from the recording apparatus 100, and the display apparatus 200 displays the selection screen (Step S30). An explanation will now be made with reference to FIG. 11 about the selection screen displayed by the display apparatus 200. FIG. 11 illustrates an example of the selection screen displayed by the display apparatus 200. In the example illustrated in FIG. 11, when a part of the content is deleted from the recording apparatus 100, the user selects the part to be deleted. In this embodiment, the recording apparatus 100 records the first information and the second information while allowing the first information and the second information to be in correlation with the content. Therefore, the user can select whether or not the part is deleted from the recording apparatus 100 in relation to each of the parts of Period $t_0$-$t_1$, Period $t_1$-$t_4$, Period $t_4$-$t_2$, Period $t_2$-$t_3$ of the content.

The recording apparatus 100 performs the deleting process for deleting the part of the content selected by the user (Step S31). For example, if the user selects Period $t_0$-$t_1$ as the first period and Period $t_1$-$t_4$ as the third period as in the example illustrated in FIG. 11, then the recording apparatus 100 deletes only the part of Period $t_0$-$t_4$ of the content, and the recording apparatus 100 allows the part of Period $t_4$-$t_3$ to remain in the recording apparatus 100.

As explained above, in the content processing method of this embodiment, the recording apparatus 100 records the first information and the second information while allowing the first information and the second information to be in correlation with the content. Therefore, in the content processing method of this embodiment, the recording apparatus 100 can specify or identify the part which is included in the content and which has been already watched by the user while performing the recording of the content and the part which is included in the content and which has been watched by the user by playing back the recorded content. Further, the recording apparatus 100 allows the display apparatus 200 to display the selection screen by using the first information and the second information. Therefore, it is unnecessary for the user himself/herself to specify or identify the part which has been already watched by the user while performing the recording of the content and the part which has been watched by the user by playing back the recorded content.

Therefore, according to the content processing method of this embodiment, it is possible to reduce the load exerted on the user in the operation in which the part of the recorded content is played back and watched by the user and the content is edited by the user.

According to the content processing method, the recording apparatus, the program, and the recording medium having been disclosed, it is possible to reduce the load exerted on a user in an editing operation for editing the content.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A content processing method, comprising:
   receiving content and recording the content in a recording apparatus;
   recording first information to indicate a first period during a period in which the content is recorded in which a first part that is a portion of the content is displayed on a display apparatus and a second period during the period in which the content is recorded in which a second part that is a portion of the content is not displayed on the display apparatus; and
   displaying, on the display apparatus, a selection screen which is provided to select any one of the first period and/or the second period as an objective for performing any one of a plurality of processes including a deleting process for deleting at least the first part or the second part of the content and a writing process for writing at least the first part or the second part of the content on a recording medium with respect to a part of the recorded content, by using the first information, wherein the deleting process is not performed on a margin set at least before or after a part other than the first part in the content.

2. The content processing method according to claim 1, further comprising:
   playing back the content recorded in the recording apparatus; and
   recording second information to indicate a third period in which the content is played back and a fourth period in which the content is not played back, in accordance with the content,
   wherein the displaying displays, on the display apparatus, a selection screen, which is provided to select any one of the third period and/or the fourth period as the objective for performing any one of the plurality of processes, by using the second information.

3. The content processing method according to claim 1, wherein the displaying displays, on the display apparatus, a selection screen, which is provided to collectively select all of the first period or periods or all of the second period or periods as the objective for performing any one of the plurality of processes with respect to the part of the recorded content.

4. The content processing method according to claim 2, wherein the displaying displays, on the display apparatus, a selection screen, which is provided to collectively select all of the third period or periods or all of the fourth period or periods as the objective for performing any one of the plurality of processes with respect to the part of the recorded content.

5. A recording apparatus which is connectable to a display apparatus, the recording apparatus comprising:
   a receiving unit to receive content;
   a recording unit to record the content and record first information to indicate a first period during a period in which the content is recorded in which a first part that is a portion of the content is displayed on the display apparatus and a second period during the period in which the content is recorded in which a second part that is a portion of the content is not displayed on the display apparatus; and
   a control unit to perform control to display, on the display apparatus, a selection screen which is provided to select any one of the first period and/or the second period as an objective for performing any one of a plurality of processes including a deleting process for deleting at least the first part or the second part of the content and a writing process for writing at least the first part or the second part of the content on a recording medium with respect to a part of the recorded content, by using the first information, wherein the deleting process is not performed on a margin set at least before or after a part other than the first part in the content.

6. The recording apparatus according to claim 5, wherein:
   the recording unit further records second information to indicate a third period in which the content recorded in the recording apparatus is played back and a fourth period in which the content recorded in the recording apparatus is not played back, in accordance with the content; and
   the control unit further performs control to display, on the display apparatus, a selection screen which is provided to select any one of the third period and/or the fourth period as the objective for performing any one of the plurality of processes, by using the second information.

7. The recording apparatus according to claim 5, wherein the control unit performs control to display, on the display apparatus, a selection screen which is provided to collectively select all of the first period or periods or all of the second period or periods as the objective for performing any one of the plurality of processes with respect to the part of the recorded content.

8. The recording apparatus according to claim 6, wherein the control unit performs control to display, on the display apparatus, a selection screen which is provided to collectively select all of the third period or periods or all of the fourth period or periods as the objective for performing any one of the plurality of processes with respect to the part of the recorded content.

9. A non-transitory computer readable medium storing a program for making a computer, which is included in a recording apparatus connectable to a display apparatus, execute a process for processing content received by the recording apparatus, the program comprising computer-executable instructions to perform:

recording the received content in the recording apparatus;

recording first information to indicate a first period during a period in which the content is recorded in which a first part that is a portion of the content is displayed on the display apparatus and a second period during a period in which the content is recorded in which a second part that is a portion of the content is not displayed on the display apparatus; and displaying, on the display apparatus, a selection screen which is provided to select any one of the first period and/or the second period as an objective for performing any one of a plurality of processes including a deleting process for deleting at least the first part or the second part of the content and a writing process for writing at least the first part or the second part of the content on a recording medium with respect to a part of the recorded content, by using the first information, wherein the deleting process is not performed on a margin set at least before or after a part other than the first part in the content.

10. The non-transitory computer readable medium according to claim 9, the program comprising computer-executable instructions to further perform:

playing back, by the recording apparatus, the content which is the recorded content; and recording, in the recording apparatus, second information to indicate a third period in which the content is played back and a fourth period in which the content is not played back, in accordance with the content, wherein:

the displaying displays, on the display apparatus, a selection screen, which is provided to select any one of the third period and/or the fourth period as the objective for performing any one of the plurality of processes, by using the second information.

11. The non-transitory computer readable medium according to claim 9, wherein the displaying displays, on the display apparatus, a selection screen, which is provided to collectively select all of the first period or periods or all of the second period or periods as the objective for performing any one of the plurality of processes with respect to the part of the recorded content.

12. The non-transitory computer readable medium according to claim 10, wherein the displaying displays, on the display apparatus, a selection screen, which is provided to collectively select all of the third period or periods or all of the fourth period or periods as the objective for performing any one of the plurality of processes with respect to the part of the recorded content.

* * * * *